(12) United States Patent
Acharya et al.

(10) Patent No.: US 7,346,839 B2
(45) Date of Patent: Mar. 18, 2008

(54) INFORMATION RETRIEVAL BASED ON HISTORICAL DATA

(75) Inventors: Anurag Acharya, Campbell, CA (US); Matt Cutts, Mountain View, CA (US); Jeffrey Dean, Palo Alto, CA (US); Paul Haahr, San Francisco, CA (US); Monika Henzinger, Lausanne (CH); Urs Hoelzle, Palo Alto, CA (US); Steve Lawrence, Mountain View, CA (US); Karl Pfleger, Mountain View, CA (US); Olcan Sercinoglu, Mountain View, CA (US); Simon Tong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 657 days.

(21) Appl. No.: 10/748,664

(22) Filed: Dec. 31, 2003

(65) Prior Publication Data

US 2005/0071741 A1    Mar. 31, 2005

Related U.S. Application Data

(60) Provisional application No. 60/507,617, filed on Sep. 30, 2003.

(51) Int. Cl.
*G06F 17/00* (2006.01)
*G06F 7/00* (2006.01)
*G06F 3/00* (2006.01)

(52) U.S. Cl. .................. 715/500; 707/3; 700/92

(58) Field of Classification Search ............ 707/3–5; 700/92; 715/500
See application file for complete search history.

(56) References Cited

U.S. PATENT DOCUMENTS

| 6,285,999 | B1 | | 9/2001 | Page | |
|---|---|---|---|---|---|
| 6,421,675 | B1 | * | 7/2002 | Ryan et al. | 707/100 |
| 6,546,388 | B1 | | 4/2003 | Edlund | |
| 7,093,012 | B2 | * | 8/2006 | Olstad et al. | 709/224 |
| 2002/0073065 | A1 | * | 6/2002 | Inaba et al. | 707/1 |
| 2002/0123988 | A1 | | 9/2002 | Dean et al. | 707/3 |
| 2002/0198875 | A1 | * | 12/2002 | Masters | 707/4 |
| 2004/0098405 | A1 | | 5/2004 | Zrubek et al. | |
| 2004/0243557 | A1 | | 12/2004 | Broder et al. | |
| 2006/0036588 | A1 | | 2/2006 | Frank et al. | |

FOREIGN PATENT DOCUMENTS

EP    1 107 128 A1    6/2001

OTHER PUBLICATIONS

Junyan Ding et al.; "Computing Geographical Scopes of Web Resources"; Proceedings of the 26th VLDB Conference, Cairo Egypt, 2000; 12 pages.

(Continued)

*Primary Examiner*—Alford Kindred
*Assistant Examiner*—Hung Vy
(74) *Attorney, Agent, or Firm*—Harrity Snyder, LLP

(57) ABSTRACT

A system identifies a document and obtains one or more types of history data associated with the document. The system may generate a score for the document based, at least in part, on the one or more types of history data.

56 Claims, 4 Drawing Sheets

OTHER PUBLICATIONS

Co-pending U.S. Appl. No. 10/879,503, filed Jun. 30, 2004, titled "Systems and Methods for Determining Document Freshness," Monika Henzinger; 23 page specification, 5 sheets of drawings.

Co-pending U.S. Appl. No. 11/561,625, entitled "Document Scoring Based on Document Inception Date", by Matt Cutts et al., filed on Nov. 20, 2006, 49 pages.

Co-pending U.S. Appl. No. 11/562,285, entitled "Document Scoring Based on Document Content Update", by Anurag Acharya et al., filed on Nov. 21, 2006, 50 pages.

Co-pending U.S. Appl. No. 11/562,617, entitled "Document Scoring Based on Query Analysis" by Jeffrey Dean et al., filed on Nov. 22, 2006, 48 pages.

Co-pending U.S. Appl. No. 11/565,004, entitled "Document Scoring Based on Link-Based Criteria", Anurag Acharya et al., filed on Nov. 30, 2006, 50 pages.

Co-pending U.S. Appl. No. 11/565,026, entitled "Document Scoring Based on Traffic Associated With a Document", by Steve Lawrence, filed on Nov. 30, 2006, 47 pages.

Co-pending U.S. Appl. No. 11/536,901, entitled "Personalized Search Result Ranking", by Oren Zamir et al., filed on Sep. 29, 2006, 34 pages.

Copy of the International Search Report and Written Opinion for corresponding PCT application with a mailing date of Feb. 11, 2005, 14 pages.

Office Action from U.S. Appl. No. 10/879,503, dated Jan. 26, 2007; 10 pages.

Office Action from U.S. Appl. No. 10/879,503, dated Jul. 30, 2007; 12 pages.

* cited by examiner

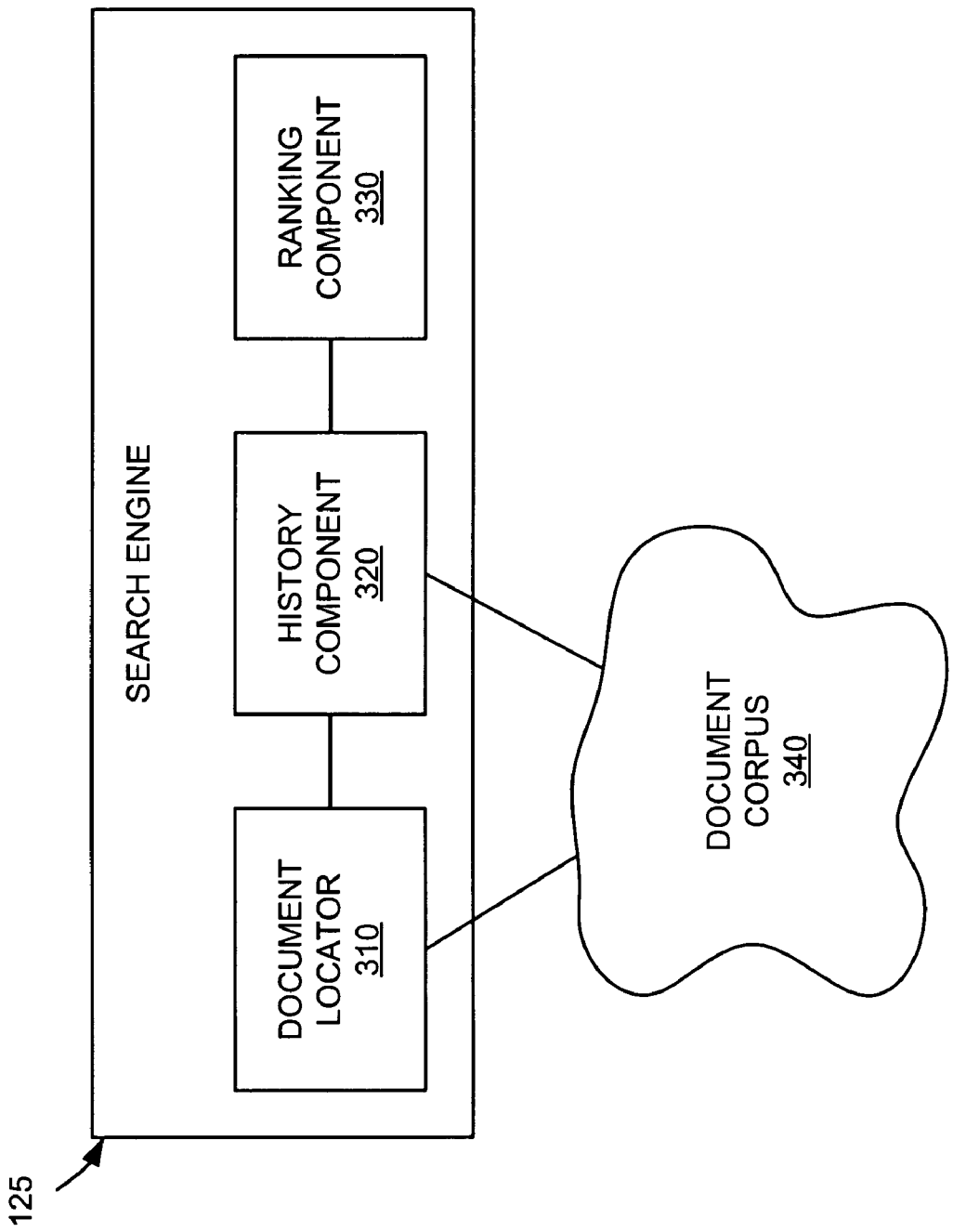

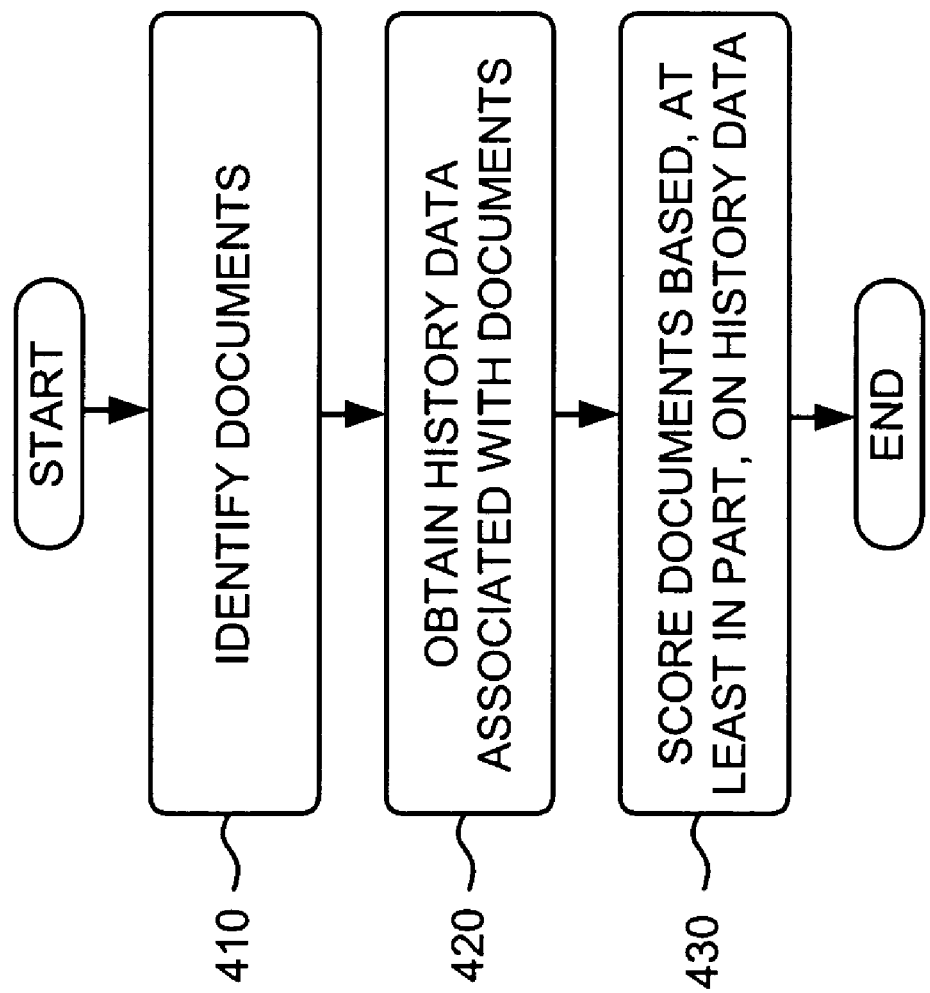

INFORMATION RETRIEVAL BASED ON HISTORICAL DATA

RELATED APPLICATION

This application claims priority under 35 U.S.C. § 119 based on U.S. Provisional Application No. 60/507,617, filed Sep. 30, 2003, the disclosure of which is incorporated herein by reference.

BACKGROUND OF THE INVENTION

1. Field of the Invention

The present invention relates generally to information retrieval systems and, more particularly, to systems and methods for generating search results based, at least in part, on historical data associated with relevant documents.

2. Description of Related Art

The World Wide Web ("web") contains a vast amount of information. Search engines assist users in locating desired portions of this information by cataloging web documents. Typically, in response to a user's request, a search engine returns links to documents relevant to the request.

Search engines may base their determination of the user's interest on search terms (called a search query) provided by the user. The goal of a search engine is to identify links to high quality relevant results based on the search query. Typically, the search engine accomplishes this by matching the terms in the search query to a corpus of pre-stored web documents. Web documents that contain the user's search terms are considered "hits" and are returned to the user.

Ideally, a search engine, in response to a given user's search query, will provide the user with the most relevant results. One category of search engines identifies relevant documents based on a comparison of the search query terms to the words contained in the documents. Another category of search engines identifies relevant documents using factors other than, or in addition to, the presence of the search query terms in the documents. One such search engine uses information associated with links to or from the documents to determine the relative importance of the documents.

Both categories of search engines strive to provide high quality results for a search query. There are several factors that may affect the quality of the results generated by a search engine. For example, some web site producers use spamming techniques to artificially inflate their rank. Also, "stale" documents (i.e., those documents that have not been updated for a period of time and, thus, contain stale data) may be ranked higher than "fresher" documents (i.e., those documents that have been more recently updated and, thus, contain more recent data). In some particular contexts, the higher ranking stale documents degrade the search results.

Thus, there remains a need to improve the quality of results generated by search engines.

SUMMARY OF THE INVENTION

Systems and methods consistent with the principles of the invention may score documents based, at least in part, on history data associated with the documents. This scoring may be used to improve search results generated in connection with a search query.

According to one aspect consistent with the principles of the invention, a method for scoring a document is provided. The method may include identifying a document and obtaining one or more types of history data associated with the document. The method may further include generating a score for the document based, at least in part, on the one or more types of history data.

According to another aspect, a method for scoring documents is provided. The method may include determining an age of linkage data associated with a linked document and ranking the linked document based on a decaying function of the age of the linkage data.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3 is an exemplary functional block diagram of the search engine of FIG. 1 according to an implementation consistent with the principles of the invention; and FIG. 4 is a flowchart of exemplary processing for scoring documents according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

Systems and methods consistent with the principles of the invention may score documents using, for example, history data associated with the documents. The systems and methods may use these scores to provide high quality search results.

A "document," as the term is used herein, is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A page may correspond to a document or a portion of a document. Therefore, the words "page" and "document" may be used interchangeably in some cases. In other cases, a page may refer to a portion of a document, such as a sub-document. It may also be possible for a page to correspond to more than a single document.

In the description to follow, documents may be described as having links to other documents and/or links from other documents. For example, when a document includes a link to another document, the link may be referred to as a "forward link." When a document includes a link from another document, the link may be referred to as a "back link." When the term "link" is used, it may refer to either a back link or a forward link.

Exemplary Network Configuration

Figure 1:
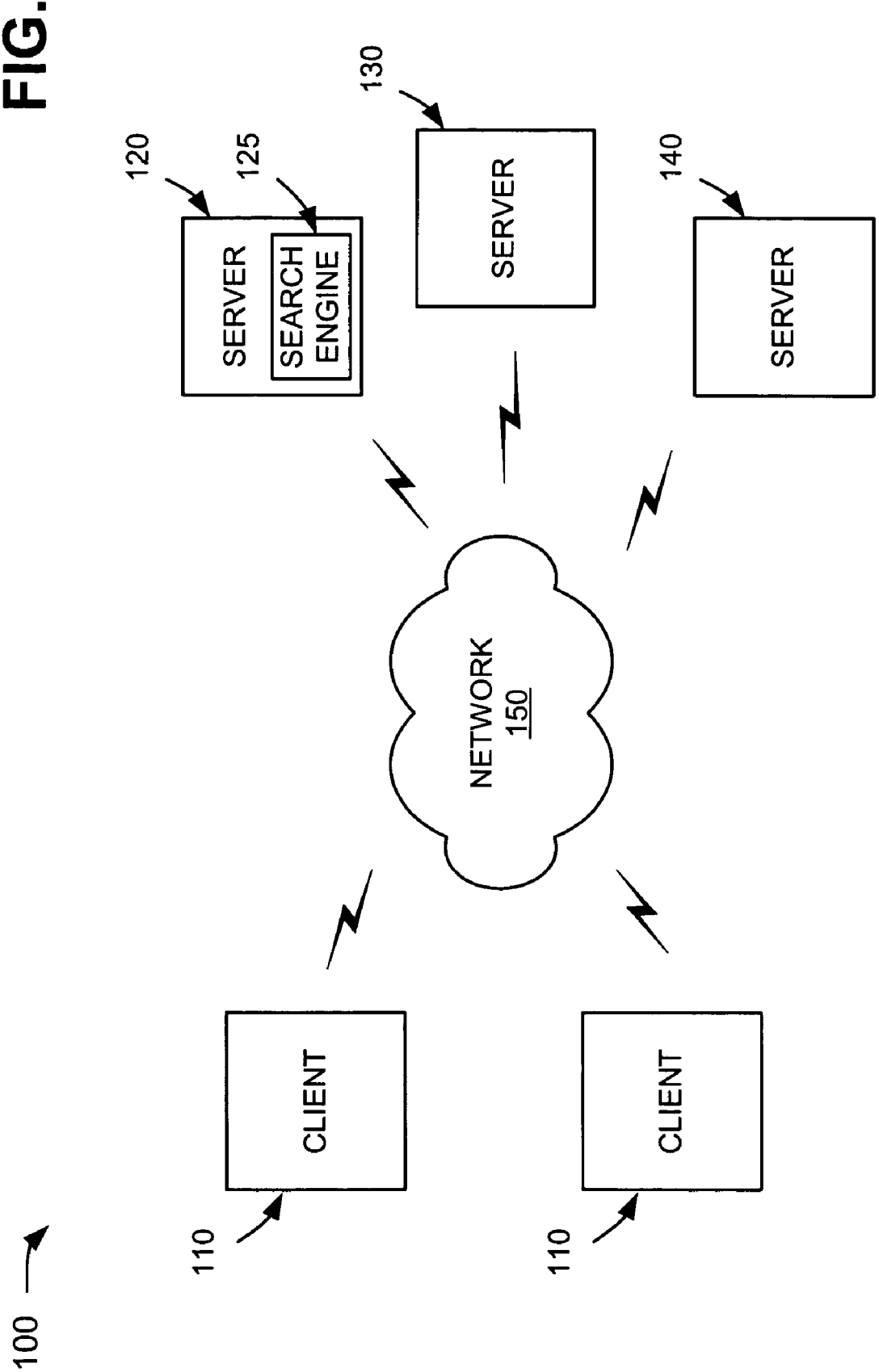
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-140 via a network 150. Network 150 may include a local area network (LAN), a wide area network (WAN), a telephone network, such as the Public Switched Telephone Network (PSTN), an intranet, the Internet, a memory device, another type of network, or a combination of networks. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these device. Servers 120-140 may include server entities that gather, process, search, and/or maintain documents in a manner consistent with the principles of the invention. Clients 110 and servers 120-140 may connect to network 150 via wired, wireless, and/or optical connections.

In an implementation consistent with the principles of the invention, server 120 may include a search engine 125 usable by clients 110. Server 120 may crawl a corpus of documents (e.g., web pages), index the documents, and store information associated with the documents in a repository of crawled documents. Servers 130 and 140 may store or maintain documents that may be crawled by server 120. While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible for a single one of servers 120-140 to be implemented as two or more separate (and possibly distributed) devices.

Exemplary Client/Server Architecture

Figure 2:
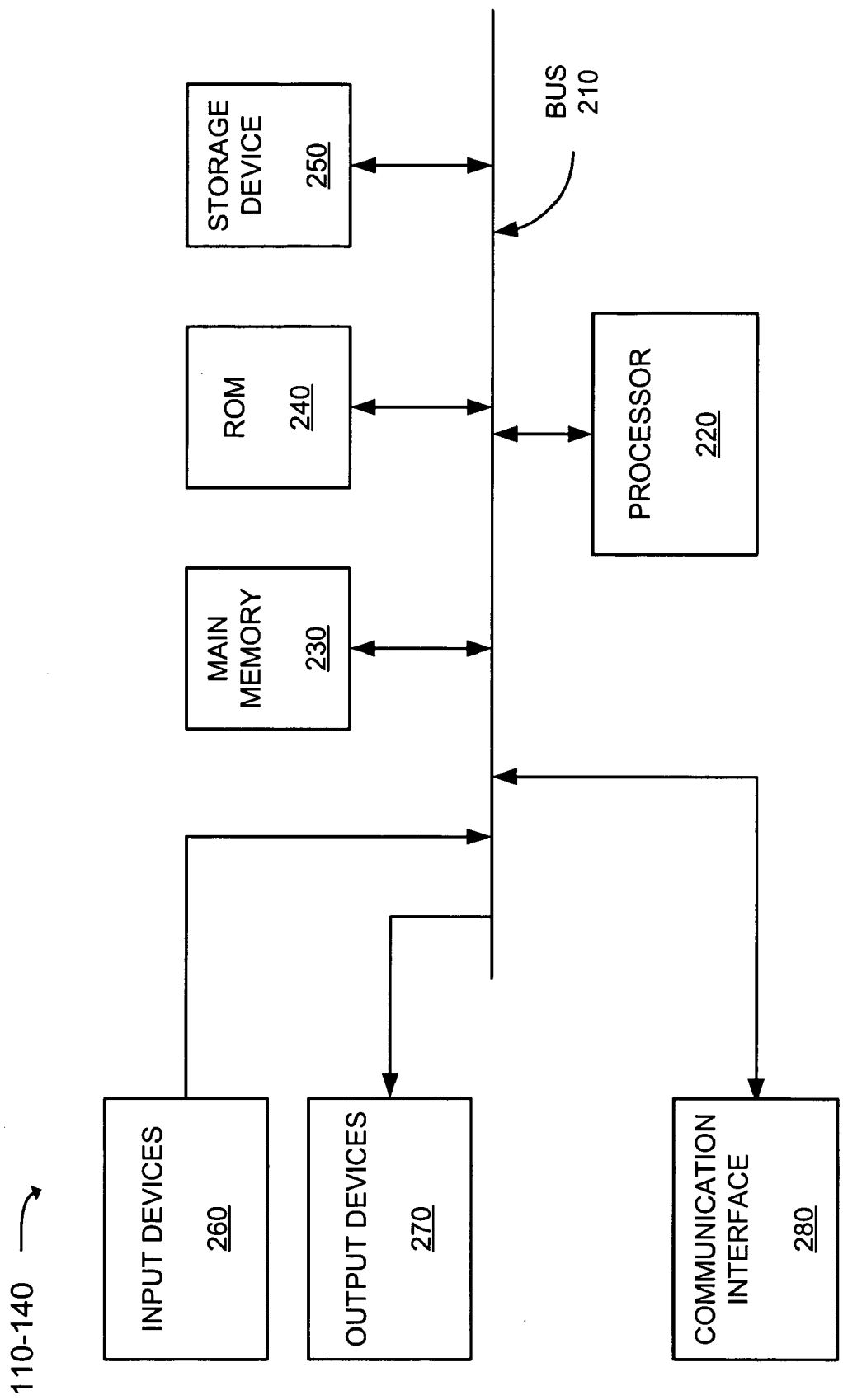
FIG. 2 is an exemplary diagram of a client and/or server of FIG. 1 according to an implementation consistent with the principles of the invention.

FIG. 2 is an exemplary diagram of a client or server entity (hereinafter called "client/server entity"), which may correspond to one or more of clients 110 and servers 120-140, according to an implementation consistent with the principles of the invention. The client/server entity may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of the client/server entity.

Processor 220 may include one or more conventional processors or microprocessors that interpret and execute instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit an operator to input information to the client/server entity, such as a keyboard, a mouse, a pen, voice recognition and/or biometric mechanisms, etc. Output device(s) 270 may include one or more conventional mechanisms that output information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity, consistent with the principles of the invention, perform certain searching-related operations. The client/server entity may perform these operations in response to processor 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Search Engine

FIG. 3 is an exemplary functional block diagram of search engine 125 according to an implementation consistent with the principles of the invention. Search engine 125 may include document locator 310, history component 320, and ranking component 330. As shown in FIG. 3, document locator 310 and/or history component 320 may connect to a document corpus 340. Document corpus 340 may include information associated with documents that were previously crawled, indexed, and stored, for example, in a database accessible by search engine 125. History data, as will be described in more detail below, may be associated with each of the documents in document corpus 340. The history data may be stored in document corpus 340 or elsewhere.

Document locator 310 may identify a set of documents whose contents match a user search query. Document locator 310 may initially locate documents from document corpus 340 by comparing the terms in the user's search query to the documents in the corpus. In general, processes for indexing documents and searching the indexed collection to return a set of documents containing the searched terms are well known in the art. Accordingly, this functionality of document locator 310 will not be described further herein.

History component 320 may gather history data associated with the documents in document corpus 340. In implementations consistent with the principles of the invention, the history data may include data relating to: document inception dates; document content updates/changes; query analysis; link-based criteria; anchor text (e.g., the text in which a hyperlink is embedded, typically underlined or otherwise highlighted in a document); traffic; user behavior; domain-related information; ranking history; user maintained/generated data (e.g., bookmarks); unique words, bigrams, and phrases in anchor text; linkage of independent peers; and/or document topics. These different types of history data are described in additional detail below. In other implementations, the history data may include additional or different kinds of data.

Ranking component 330 may assign a ranking score (also called simply a "score" herein) to one or more documents in document corpus 340. Ranking component 330 may assign the ranking scores prior to, independent of, or in connection with a search query. When the documents are associated with a search query (e.g., identified as relevant to the search query), search engine 125 may sort the documents based on the ranking score and return the sorted set of documents to the client that submitted the search query. Consistent with aspects of the invention, the ranking score is a value that attempts to quantify the quality of the documents. In implementations consistent with the principles of the invention, the score is based, at least in part, on the history data from history component 320.

Exemplary History Data

Document Inception Date

According to an implementation consistent with the principles of the invention, a document's inception date may be used to generate (or alter) a score associated with that document. The term "date" is used broadly here and may, thus, include time and date measurements. As described below, there are several techniques that can be used to determine a document's inception date. Some of these techniques are "biased" in the sense that they can be influenced by third parties desiring to improve the score associated with a document. Other techniques are not biased. Any of these techniques, combinations of these techniques, or yet other techniques may be used to determine a document's inception date.

According to one implementation, the inception date of a document may be determined from the date that search engine 125 first learns of or indexes the document. Search engine 125 may discover the document through crawling, submission of the document (or a representation/summary thereof) to search engine 125 from an "outside" source, a combination of crawl or submission-based indexing techniques, or in other ways. Alternatively, the inception date of a document may be determined from the date that search engine 125 first discovers a link to the document.

According to another implementation, the date that a domain with which a document is registered may be used as an indication of the inception date of the document. According to yet another implementation, the first time that a document is referenced in another document, such as a news article, newsgroup, mailing list, or a combination of one or more such documents, may be used to infer an inception date of the document. According to a further implementation, the date that a document includes at least a threshold number of pages may be used as an indication of the inception date of the document. According to another implementation, the inception date of a document may be equal to a time stamp associated with the document by the server hosting the document. Other techniques, not specifically mentioned herein, or combinations of techniques could be used to determine or infer a document's inception date.

Search engine 125 may use the inception date of a document for scoring of the document. For example, it may be assumed that a document with a fairly recent inception date will not have a significant number of links from other documents (i.e., back links). For existing link-based scoring techniques that score based on the number of links to/from a document, this recent document may be scored lower than an older document that has a larger number of links (e.g., back links). When the inception date of the documents are considered, however, the scores of the documents may be modified (either positively or negatively) based on the documents' inception dates.

Consider the example of a document with an inception date of yesterday that is referenced by 10 back links. This document may be scored higher by search engine 125 than a document with an inception date of 10 years ago that is referenced by 100 back links because the rate of link growth for the former is relatively higher than the latter. While a spiky rate of growth in the number of back links may be a factor used by search engine 125 to score documents, it may also signal an attempt to spam search engine 125. Accordingly, in this situation, search engine 125 may actually lower the score of a document(s) to reduce the effect of spamming.

Thus, according to an implementation consistent with the principles of the invention, search engine 125 may use the inception date of a document to determine a rate at which links to the document are created (e.g., as an average per unit time based on the number of links created since the inception date or some window in that period). This rate can then be used to score the document, for example, giving more weight to documents to which links are generated more often.

In one implementation, search engine 125 may modify the link-based score of a document as follows:

$$H = L/\log(F+2),$$

where H may refer to the history-adjusted link score, L may refer to the link score given to the document, which can be derived using any known link scoring technique (e.g., the scoring technique described in U.S. Pat. No. 6,285,999) that assigns a score to a document based on links to/from the document, and F may refer to elapsed time measured from the inception date associated with the document (or a window within this period).

For some queries, older documents may be more favorable than newer ones. As a result, it may be beneficial to adjust the score of a document based on the difference (in age) from the average age of the result set. In other words, search engine 125 may determine the age of each of the documents in a result set (e.g., using their inception dates), determine the average age of the documents, and modify the scores of the documents (either positively or negatively) based on a difference between the documents' age and the average age.

In summary, search engine 125 may generate (or alter) a score associated with a document based, at least in part, on information relating to the inception date of the document.

Content Updates/Changes

According to an implementation consistent with the principles of the invention, information relating to a manner in which a document's content changes over time may be used to generate (or alter) a score associated with that document. For example, a document whose content is edited often may be scored differently than a document whose content remains static over time. Also, a document having a relatively large amount of its content updated over time might be scored differently than a document having a relatively small amount of its content updated over time.

In one implementation, search engine 125 may generate a content update score (U) as follows:

U=f(UF, UA), where f may refer to a function, such as a sum or weighted sum, UF may refer to an update frequency score that represents how often a document (or page) is updated, and UA may refer to an update amount score that represents how much the document (or page) has changed over time. UF may be determined in a number of ways, including as an average time between updates, the number of updates in a given time period, etc.

UA may also be determined as a function of one or more factors, such as the number of "new" or unique pages associated with a document over a period of time. Another factor might include the ratio of the number of new or unique pages associated with a document over a period of time versus the total number of pages associated with that document. Yet another factor may include the amount that the document is updated over one or more periods of time (e.g., n % of a document's visible content may change over a period t (e.g., last m months)), which might be an average value. A further factor might include the amount that the document (or page) has changed in one or more periods of time (e.g., within the last x days).

According to one exemplary implementation, UA may be determined as a function of differently weighted portions of document content. For instance, content deemed to be unimportant if updated/changed, such as Javascript, comments, advertisements, navigational elements, boilerplate material, or date/time tags, may be given relatively little weight or even ignored altogether when determining UA. On the other hand, content deemed to be important if updated/changed (e.g., more often, more recently, more extensively, etc.), such as the title or anchor text associated with the forward links, could be given more weight than changes to other content when determining UA.

UF and UA may be used in other ways to influence the score assigned to a document. For example, the rate of change in a current time period can be compared to the rate of change in another (e.g., previous) time period to determine whether there is an acceleration or deceleration trend. Documents for which there is an increase in the rate of change might be scored higher than those documents for which there is a steady rate of change, even if that rate of change is relatively high. The amount of change may also be a factor in this scoring. For example, documents for which there is an increase in the rate of change when that amount of change is greater than some threshold might be scored higher than those documents for which there is a steady rate of change or an amount of change is less than the threshold.

In some situations, data storage resources may be insufficient to store the documents when monitoring the documents for content changes. In this case, search engine 125 may store representations of the documents and monitor these representations for changes. For example, search engine 125 may store "signatures" of documents instead of the (entire) documents themselves to detect changes to document content. In this case, search engine 125 may store a term vector for a document (or page) and monitor it for relatively large changes. According to another implementation, search engine 125 may store and monitor a relatively small portion (e.g., a few terms) of the documents that are determined to be important or the most frequently occurring (excluding "stop words").

According to yet another implementation, search engine 125 may store a summary or other representation of a document and monitor this information for changes. According to a further implementation, search engine 125 may generate a similarity hash (which may be used to detect near-duplication of a document) for the document and monitor it for changes. A change in a similarity hash may be considered to indicate a relatively large change in its associated document. In other implementations, yet other techniques may be used to monitor documents for changes. In situations where adequate data storage resources exist, the full documents may be stored and used to determine changes rather than some representation of the documents.

For some queries, documents with content that has not recently changed may be more favorable than documents with content that has recently changed. As a result, it may be beneficial to adjust the score of a document based on the difference from the average date-of-change of the result set. In other words, search engine 125 may determine a date when the content of each of the documents in a result set last changed, determine the average date of change for the documents, and modify the scores of the documents (either positively or negatively) based on a difference between the documents' date-of-change and the average date-of-change.

In summary, search engine 125 may generate (or alter) a score associated with a document based, at least in part, on information relating to a manner in which the document's content changes over time. For very large documents that include content belonging to multiple individuals or organizations, the score may correspond to each of the sub-documents (i.e., that content belonging to or updated by a single individual or organization).

Query Analysis

According to an implementation consistent with the principles of the invention, one or more query-based factors may be used to generate (or alter) a score associated with a document. For example, one query-based factor may relate to the extent to which a document is selected over time when the document is included in a set of search results. In this case, search engine 125 might score documents selected relatively more often/increasingly by users higher than other documents.

Another query-based factor may relate to the occurrence of certain search terms appearing in queries over time. A particular set of search terms may increasingly appear in queries over a period of time. For example, terms relating to a "hot" topic that is gaining/has gained popularity or a breaking news event would conceivably appear frequently over a period of time. In this case, search engine 125 may score documents associated with these search terms (or queries) higher than documents not associated with these terms.

A further query-based factor may relate to a change over time in the number of search results generated by similar queries. A significant increase in the number of search results generated by similar queries, for example, might indicate a hot topic or breaking news and cause search engine 125 to increase the scores of documents related to such queries.

Another query-based factor may relate to queries that remain relatively constant over time but lead to results that change over time. For example, a query relating to "world series champion" leads to search results that change over time (e.g., documents relating to a particular team dominate search results in a given year or time of year). This change can be monitored and used to score documents accordingly.

Yet another query-based factor might relate to the "staleness" of documents returned as search results. The staleness of a document may be based on factors, such as document creation date, anchor growth, traffic, content change, forward/back link growth, etc. For some queries, recent documents are very important (e.g., if searching for Frequently Asked Questions (FAQ) files, the most recent version would be highly desirable). Search engine 125 may learn which queries recent changes are most important for by analyzing which documents in search results are selected by users. More specifically, search engine 125 may consider how often users favor a more recent document that is ranked lower than an older document in the search results. Additionally, if over time a particular document is included in mostly topical queries (e.g., "World Series Champions") versus more specific queries (e.g., "New York Yankees"), then this query-based factor—by itself or with others mentioned herein—may be used to lower a score for a document that appears to be stale.

In some situations, a stale document may be considered more favorable than more recent documents. As a result, search engine 125 may consider the extent to which a document is selected over time when generating a score for the document. For example, if for a given query, users over time tend to select a lower ranked, relatively stale, document over a higher ranked, relatively recent document, this may be used by search engine 125 as an indication to adjust a score of the stale document.

Yet another query-based factor may relate to the extent to which a document appears in results for different queries. In other words, the entropy of queries for one or more documents may be monitored and used as a basis for scoring. For example, if a particular document appears as a hit for a discordant set of queries, this may (though not necessarily) be considered a signal that the document is spam, in which case search engine 125 may score the document relatively lower.

In summary, search engine 125 may generate (or alter) a score associated with a document based, at least in part, on one or more query-based factors.

Link-Based Criteria

According to an implementation consistent with the principles of the invention, one or more link-based factors may be used to generate (or alter) a score associated with a document. In one implementation, the link-based factors may relate to the dates that new links appear to a document and that existing links disappear. The appearance date of a link may be the first date that search engine 125 finds the link or the date of the document that contains the link (e.g., the date that the document was found with the link or the date that it was last updated). The disappearance date of a link may be the first date that the document containing the link either dropped the link or disappeared itself.

These dates may be determined by search engine 125 during a crawl or index update operation. Using this date as a reference, search engine 125 may then monitor the time-varying behavior of links to the document, such as when links appear or disappear, the rate at which links appear or disappear over time, how many links appear or disappear during a given time period, whether there is trend toward appearance of new links versus disappearance of existing links to the document, etc.

Using the time-varying behavior of links to (and/or from) a document, search engine 125 may score the document accordingly. For example, a downward trend in the number or rate of new links (e.g., based on a comparison of the number or rate of new links in a recent time period versus an older time period) over time could signal to search engine 125 that a document is stale, in which case search engine 125 may decrease the document's score. Conversely, an upward trend may signal a "fresh" document (e.g., a document whose content is fresh—recently created or updated) that might be considered more relevant, depending on the particular situation and implementation.

By analyzing the change in the number or rate of increase/decrease of back links to a document (or page) over time, search engine 125 may derive a valuable signal of how fresh the document is. For example, if such analysis is reflected by a curve that is dropping off, this may signal that the document may be stale (e.g., no longer updated, diminished in importance, superceded by another document, etc.).

According to one implementation, the analysis may depend on the number of new links to a document. For example, search engine 125 may monitor the number of new links to a document in the last n days compared to the number of new links since the document was first found. Alternatively, search engine 125 may determine the oldest age of the most recent y % of links compared to the age of the first link found.

For the purpose of illustration, consider y=10 and two documents (web sites in this example) that were both first found 100 days ago. For the first site, 10% of the links were found less than 10 days ago, while for the second site 0% of the links were found less than 10 days ago (in other words, they were all found earlier). In this case, the metric results in 0.1 for site A and 0 for site B. The metric may be scaled appropriately. In another exemplary implementation, the metric may be modified by performing a relatively more detailed analysis of the distribution of link dates. For example, models may be built that predict if a particular distribution signifies a particular type of site (e.g., a site that is no longer updated, increasing or decreasing in popularity, superceded, etc.).

According to another implementation, the analysis may depend on weights assigned to the links. In this case, each link may be weighted by a function that increases with the freshness of the link. The freshness of a link may be determined by the date of appearance/change of the link, the date of appearance/change of anchor text associated with the link, date of appearance/change of the document containing the link. The date of appearance/change of the document containing a link may be a better indicator of the freshness of the link based on the theory that a good link may go unchanged when a document gets updated if it is still relevant and good. In order to not update every link's freshness from a minor edit of a tiny unrelated part of a document, each updated document may be tested for significant changes (e.g., changes to a large portion of the document or changes to many different portions of the document) and a link's freshness may be updated (or not updated) accordingly.

Links may be weighted in other ways. For example, links may be weighted based on how much the documents containing the links are trusted (e.g., government documents can be given high trust). Links may also, or alternatively, be weighted based on how authoritative the documents containing the links are (e.g., authoritative documents may be determined in a manner similar to that described in U.S. Pat. No. 6,285,999). Links may also, or alternatively, be weighted based on the freshness of the documents containing the links using some other features to establish freshness (e.g., a document that is updated frequently (e.g., the Yahoo home page) suddenly drops a link to a document).

Search engine 125 may raise or lower the score of a document to which there are links as a function of the sum of the weights of the links pointing to it. This technique may be employed recursively. For example, assume that a document S is 2 years olds. Document S may be considered fresh if n % of the links to S are fresh or if the documents containing forward links to S are considered fresh. The latter can be checked by using the creation date of the document and applying this technique recursively.

According to yet another technique, the analysis may depend on an age distribution associated with the links pointing to a document. In other words, the dates that the links to a document were created may be determined and input to a function that determines the age distribution. It may be assumed that the age distribution of a stale document will be very different from the age distribution of a fresh document. Search engine 125 may then score documents based, at least in part, on the age distributions associated with the documents.

The dates that links appear can also be used to detect "spam," where owners of documents or their colleagues create links to their own document for the purpose of boosting the score assigned by a search engine. A typical, "legitimate" document attracts back links slowly. A large spike in the quantity of back links may signal a topical phenomenon (e.g., the CDC web site may develop many links quickly after an outbreak, such as SARS), or signal attempts to spam a search engine (to obtain a higher ranking and, thus, better placement in search results) by exchanging links, purchasing links, or gaining links from documents without editorial discretion on making links. Examples of documents that give links without editorial discretion include guest books, referrer logs, and "free for all" pages that let anyone add a link to a document.

According to a further implementation, the analysis may depend on the date that links disappear. The disappearance of many links can mean that the document to which these links point is stale (e.g., no longer being updated or has been superseded by another document). For example, search engine 125 may monitor the date at which one or more links to a document disappear, the number of links that disappear in a given window of time, or some other time-varying decrease in the number of links (or links/updates to the documents containing such links) to a document to identify documents that may be considered stale. Once a document has been determined to be stale, the links contained in that document may be discounted or ignored by search engine 125 when determining scores for documents pointed to by the links.

According to another implementation, the analysis may depend, not only on the age of the links to a document, but also on the dynamic-ness of the links. As such, search engine 125 may weight documents that have a different featured link each day, despite having a very fresh link, differently (e.g., lower) than documents that are consistently updated and consistently link to a given target document. In one exemplary implementation, search engine 125 may generate a score for a document based on the scores of the documents with links to the document for all versions of the documents within a window of time. Another version of this may factor a discount/decay into the integration based on the major update times of the document.

In summary, search engine 125 may generate (or alter) a score associated with a document based, at least in part, on one or more link-based factors.

Anchor Text

According to an implementation consistent with the principles of the invention, information relating to a manner in which anchor text changes over time may be used to generate (or alter) a score associated with a document. For example, changes over time in anchor text associated with links to a document may be used as an indication that there has been an update or even a change of focus in the document.

Alternatively, if the content of a document changes such that it differs significantly from the anchor text associated with its back links, then the domain associated with the document may have changed significantly (completely) from a previous incarnation. This may occur when a domain expires and a different party purchases the domain. Because anchor text is often considered to be part of the document to which its associated link points, the domain may show up in search results for queries that are no longer on topic. This is an undesirable result.

One way to address this problem is to estimate the date that a domain changed its focus. This may be done by determining a date when the text of a document changes significantly or when the text of the anchor text changes significantly. All links and/or anchor text prior to that date may then be ignored or discounted.

The freshness of anchor text may also be used as a factor in scoring documents. The freshness of an anchor text may be determined, for example, by the date of appearance/change of the anchor text, the date of appearance/change of the link associated with the anchor text, and/or the date of appearance/change of the document to which the associated link points. The date of appearance/change of the document pointed to by the link may be a good indicator of the freshness of the anchor text based on the theory that good anchor text may go unchanged when a document gets updated if it is still relevant and good. In order to not update an anchor text's freshness from a minor edit of a tiny unrelated part of a document, each updated document may be tested for significant changes (e.g., changes to a large portion of the document or changes to many different portions of the document) and an anchor text's freshness may be updated (or not updated) accordingly.

In summary, search engine 125 may generate (or alter) a score associated with a document based, at least in part, on information relating to a manner in which anchor text changes over time.

Traffic

According to an implementation consistent with the principles of the invention, information relating to traffic associated with a document over time may be used to generate (or alter) a score associated with the document. For example, search engine 125 may monitor the time-varying characteristics of traffic to, or other "use" of, a document by one or more users. A large reduction in traffic may indicate that a document may be stale (e.g., no longer be updated or may be superseded by another document).

In one implementation, search engine 125 may compare the average traffic for a document over the last j days (e.g., where j=30) to the average traffic during the month where the document received the most traffic, optionally adjusted for seasonal changes, or during the last k days (e.g., where k=365). Optionally, search engine 125 may identify repeating traffic patterns or perhaps a change in traffic patterns over time. It may be discovered that there are periods when a document is more or less popular (i.e., has more or less traffic), such as during the summer months, on weekends, or during some other seasonal time period. By identifying repeating traffic patterns or changes in traffic patterns, search engine 125 may appropriately adjust its scoring of the document during and outside of these periods.

Additionally, or alternatively, search engine 125 may monitor time-varying characteristics relating to "advertising traffic" for a particular document. For example, search engine 125 may monitor one or a combination of the following factors: (1) the extent to and rate at which advertisements are presented or updated by a given document over time; (2) the quality of the advertisers (e.g., a document whose advertisements refer/link to documents known to search engine 125 over time to have relatively high traffic and trust, such as amazon.com, may be given relatively more weight than those documents whose advertisements refer to low traffic/untrustworthy documents, such as a pornographic site); and (3) the extent to which the advertisements generate user traffic to the documents to which they relate (e.g., their click-through rate). Search engine 125 may use these time-varying characteristics relating to advertising traffic to score the document.

In summary, search engine 125 may generate (or alter) a score associated with a document based, at least in part, on information relating to traffic associated with the document over time.

User Behavior

According to an implementation consistent with the principles of the invention, information corresponding to individual or aggregate user behavior relating to a document over time may be used to generate (or alter) a score associated with the document. For example, search engine 125 may monitor the number of times that a document is selected from a set of search results and/or the amount of time one or more users spend accessing the document. Search engine 125 may then score the document based, at least in part, on this information.

If a document is returned for a certain query and over time, or within a given time window, users spend either more or less time on average on the document given the same or similar query, then this may be used as an indication that the document is fresh or stale, respectively. For example, assume that the query "Riverview swimming schedule" returns a document with the title "Riverview Swimming Schedule." Assume further that users used to spend 30 seconds accessing it, but now every user that selects the document only spends a few seconds accessing it. Search engine 125 may use this information to determine that the document is stale (i.e., contains an outdated swimming schedule) and score the document accordingly.

In summary, search engine 125 may generate (or alter) a score associated with a document based, at least in part, on information corresponding to individual or aggregate user behavior relating to the document over time.

Domain-Related Information

According to an implementation consistent with the principles of the invention, information relating to a domain associated with a document may be used to generate (or alter) a score associated with the document. For example, search engine 125 may monitor information relating to how a document is hosted within a computer network (e.g., the Internet, an intranet or other network or database of documents) and use this information to score the document.

Individuals who attempt to deceive (spam) search engines often use throwaway or "doorway" domains and attempt to obtain as much traffic as possible before being caught. Information regarding the legitimacy of the domains may be used by search engine 125 when scoring the documents associated with these domains.

Certain signals may be used to distinguish between illegitimate and legitimate domains. For example, domains can be renewed up to a period of 10 years. Valuable (legitimate) domains are often paid for several years in advance, while doorway (illegitimate) domains rarely are used for more than a year. Therefore, the date when a domain expires in the future can be used as a factor in predicting the legitimacy of a domain and, thus, the documents associated therewith.

Also, or alternatively, the domain name server (DNS) record for a domain may be monitored to predict whether a domain is legitimate. The DNS record contains details of who registered the domain, administrative and technical addresses, and the addresses of name servers (i.e., servers that resolve the domain name into an IP address). By analyzing this data over time for a domain, illegitimate domains may be identified. For instance, search engine 125 may monitor whether physically correct address information exists over a period of time, whether contact information for the domain changes relatively often, whether there is a relatively high number of changes between different name servers and hosting companies, etc. In one implementation, a list of known-bad contact information, name servers, and/or IP addresses may be identified, stored, and used in predicting the legitimacy of a domain and, thus, the documents associated therewith.

Also, or alternatively, the age, or other information, regarding a name server associated with a domain may be used to predict the legitimacy of the domain. A "good" name server may have a mix of different domains from different registrars and have a history of hosting those domains, while a "bad" name server might host mainly pornography or doorway domains, domains with commercial words (a common indicator of spam), or primarily bulk domains from a single registrar, or might be brand new. The newness of a name server might not automatically be a negative factor in determining the legitimacy of the associated domain, but in combination with other factors, such as ones described herein, it could be.

In summary, search engine 125 may generate (or alter) a score associated with a document based, at least in part, on information relating to a legitimacy of a domain associated with the document.

Ranking History

According to an implementation consistent with the principles of the invention, information relating to prior rankings of a document may be used to generate (or alter) a score associated with the document. For example, search engine 125 may monitor the time-varying ranking of a document in response to search queries provided to search engine 125. Search engine 125 may determine that a document that jumps in rankings across many queries might be a topical document or it could signal an attempt to spam search engine 125.

Thus, the quantity or rate that a document moves in rankings over a period of time might be used to influence future scores assigned to that document. In one implementation, for each set of search results, a document may be weighted according to its position in the top N search results. For N=30, one example function might be $[((N+1)-SLOT)/N]^4$. In this case, a top result may receive a score of 1.0, down to a score near 0 for the Nth result.

A query set (e.g., of commercial queries) can be repeated, and documents that gained more than M % in the rankings may be flagged or the percentage growth in ranking may be used as a signal in determining scores for the documents. For example, search engine 125 may determine that a query is likely commercial if the average (median) score of the top results is relatively high and there is a significant amount of change in the top results from month to month. Search engine 125 may also monitor churn as an indication of a commercial query. For commercial queries, the likelihood of spam is higher, so search engine 125 may treat documents associated therewith accordingly.

In addition to history of positions (or rankings) of documents for a given query, search engine 125 may monitor (on a page, host, document, and/or domain basis) one or more other factors, such as the number of queries for which, and the rate at which (increasing/decreasing), a document is selected as a search result over time; seasonality, burstiness, and other patterns over time that a document is selected as a search result; and/or changes in scores over time for a URL-query pair.

In addition, or alternatively, search engine 125 may monitor a number of document (e.g., URL) independent query-based criteria over time. For example, search engine 125 may monitor the average score among a top set of results generated in response to a given query or set of queries and adjust the score of that set of results and/or other results generated in response to the given query or set of queries. Moreover, search engine 125 may monitor the number of results generated for a particular query or set of queries over time. If search engine 125 determines that the number of results increases or that there is a change in the rate of increase (e.g., such an increase may be an indication of a "hot topic" or other phenomenon), search engine 125 may score those results higher in the future.

In addition, or alternatively, search engine 125 may monitor the ranks of documents over time to detect sudden spikes in the ranks of the documents. A spike may indicate either a topical phenomenon (e.g., a hot topic) or an attempt to spam search engine 125 by, for example, trading or purchasing links. Search engine 125 may take measures to prevent spam attempts by, for example, employing hysteresis to allow a rank to grow at a certain rate. In another implementation, the rank for a given document may be allowed a certain maximum threshold of growth over a predefined window of time. As a further measure to differentiate a document related to a topical phenomenon from a spam document, search engine 125 may consider mentions of the document in news articles, discussion groups, etc. on the theory that spam documents will not be mentioned, for example, in the news. Any or a combination of these techniques may be used to curtail spamming attempts.

It may be possible for search engine 125 to make exceptions for documents that are determined to be authoritative in some respect, such as government documents, web directories (e.g., Yahoo), and documents that have shown a relatively steady and high rank over time. For example, if an unusual spike in the number or rate of increase of links to an authoritative document occurs, then search engine 125 may consider such a document not to be spam and, thus, allow a relatively high or even no threshold for (growth of) its rank (over time).

In addition, or alternatively, search engine 125 may consider significant drops in ranks of documents as an indication that these documents are "out of favor" or outdated. For example, if the rank of a document over time drops significantly, then search engine 125 may consider the document as outdated and score the document accordingly.

In summary, search engine 125 may generate (or alter) a score associated with a document based, at least in part, on information relating to prior rankings of the document.

User Maintained/Generated Data

According to an implementation consistent with the principles of the invention, user maintained or generated data may be used to generate (or alter) a score associated with a document. For example, search engine 125 may monitor data maintained or generated by a user, such as "bookmarks," "favorites," or other types of data that may provide some indication of documents favored by, or of interest to, the user. Search engine 125 may obtain this data either directly (e.g., via a browser assistant) or indirectly (e.g., via a browser). Search engine 125 may then analyze over time a number of bookmarks/favorites to which a document is associated to determine the importance of the document.

Search engine 125 may also analyze upward and downward trends to add or remove the document (or more specifically, a path to the document) from the bookmarks/favorites lists, the rate at which the document is added to or removed from the bookmarks/favorites lists, and/or whether the document is added to, deleted from, or accessed through the bookmarks/favorites lists. If a number of users are adding a particular document to their bookmarks/favorites lists or often accessing the document through such lists over time, this may be considered an indication that the document is relatively important. On the other hand, if a number of users are decreasingly accessing a document indicated in their bookmarks/favorites list or are increasingly deleting/replacing the path to such document from their lists, this may be taken as an indication that the document is outdated, unpopular, etc. Search engine 125 may then score the documents accordingly.

In an alternative implementation, other types of user data that may indicate an increase or decrease in user interest in a particular document over time may be used by search engine 125 to score the document. For example, the "temp" or cache files associated with users could be monitored by search engine 125 to identify whether there is an increase or decrease in a document being added over time. Similarly, cookies associated with a particular document might be monitored by search engine 125 to determine whether there is an upward or downward trend in interest in the document.

In summary, search engine 125 may generate (or alter) a score associated with a document based, at least in part, on user maintained or generated data.

Unique Words, Bigrams, Phrases in Anchor Text

According to an implementation consistent with the principles of the invention, information regarding unique words, bigrams, and phrases in anchor text may be used to generate (or alter) a score associated with a document. For example, search engine 125 may monitor web (or link) graphs and their behavior over time and use this information for scoring, spam detection, or other purposes. Naturally developed web graphs typically involve independent decisions. Synthetically generated web graphs, which are usually indicative of an intent to spam, are based on coordinated decisions, causing the profile of growth in anchor words/bigrams/phrases to likely be relatively spiky.

One reason for such spikiness may be the addition of a large number of identical anchors from many documents. Another possibility may be the addition of deliberately different anchors from a lot of documents. Search engine 125 may monitor the anchors and factor them into scoring a document to which their associated links point. For example, search engine 125 may cap the impact of suspect anchors on the score of the associated document. Alternatively, search engine 125 may use a continuous scale for the likelihood of synthetic generation and derive a multiplicative factor to scale the score for the document.

In summary, search engine 125 may generate (or alter) a score associated with a document based, at least in part, on information regarding unique words, bigrams, and phrases in anchor text associated with one or more links pointing to the document.

Linkage of Independent Peers

According to an implementation consistent with the principles of the invention, information regarding linkage of independent peers (e.g., unrelated documents) may be used to generate (or alter) a score associated with a document.

A sudden growth in the number of apparently independent peers, incoming and/or outgoing, with a large number of links to individual documents may indicate a potentially synthetic web graph, which is an indicator of an attempt to spam. This indication may be strengthened if the growth corresponds to anchor text that is unusually coherent or discordant. This information can be used to demote the impact of such links, when used with a link-based scoring technique, either as a binary decision item (e.g., demote the score by a fixed amount) or a multiplicative factor.

In summary, search engine 125 may generate (or alter) a score associated with a document based, at least in part, on information regarding linkage of independent peers.

Document Topics

According to an implementation consistent with the principles of the invention, information regarding document topics may be used to generate (or alter) a score associated with a document. For example, search engine 125 may perform topic extraction (e.g., through categorization, URL analysis, content analysis, clustering, summarization, a set of unique low frequency words, or some other type of topic extraction). Search engine 125 may then monitor the topic(s) of a document over time and use this information for scoring purposes.

A significant change over time in the set of topics associated with a document may indicate that the document has changed owners and previous document indicators, such as score, anchor text, etc., are no longer reliable. Similarly, a spike in the number of topics could indicate spam. For example, if a particular document is associated with a set of one or more topics over what may be considered a "stable" period of time and then a (sudden) spike occurs in the number of topics associated with the document, this may be an indication that the document has been taken over as a "doorway" document. Another indication may include the disappearance of the original topics associated with the document. If one or more of these situations are detected, then search engine 125 may reduce the relative score of such documents and/or the links, anchor text, or other data associated the document.

In summary, search engine 125 may generate (or alter) a score associated with a document based, at least in part, on changes in one or more topics associated with the document.

EXemplary Processing

FIG. 4 is a flowchart of exemplary processing for scoring documents according to an implementation consistent with the principles of the invention. Processing may begin with server 120 identifying documents (act 410). The documents may include, for example, one or more documents associated with a search query, such as documents identified as relevant to the search query. Alternatively, the documents may include one or more documents in a corpus or repository of documents that are independent of any search query (e.g., documents that are identified by crawling a network and stored in a repository).

Search engine 125 may obtain history data associated with the identified documents (act 420). As described above, the history data may take different forms. For example, the history data may include data relating to document inception dates; document content updates/changes; query analysis; link-based criteria; anchor text; traffic; user behavior; domain-related information; ranking history; user maintained/generated data (e.g., bookmarks and/or favorites); unique words, bigrams, and phrases in anchor text; linkage of independent peers; and/or document topics. Search engine 125 may obtain one, or a combination, of these kinds of history data.

Search engine 125 may then score the identified documents based, at least in part, on the history data (act 430). When the identified documents are associated with a search query, search engine 125 may also generate relevancy scores for the documents based, for example, on how relevant they are to the search query. Search engine 125 may then combine the history scores with the relevancy scores to obtain overall scores for the documents. Instead of combining the scores, search engine 125 may alter the relevancy scores for the documents based on the history data, thereby raising or lowering the scores or, in some cases, leaving the scores the same. Alternatively, search engine 125 may score the documents based on the history data without generating relevancy scores. In any event, search engine 125 may score the documents using one, or a combination, of the types of history data.

When the identified documents are associated with a search query, search engine 125 may also form search results from the scored documents. For example, search engine 125 may sort the documents based on their scores. Search engine 125 may then form references to the documents, where a reference might include a title of the document (which may contain a hypertext link that will direct the user, when selected, to the actual document) and a snippet (i.e., a text excerpt) from the document. In other implementations, the references are formed differently. Search engine 125 may present references corresponding to a number of the top-scoring documents (e.g., a predetermined number of the documents, documents with scores above a threshold, all documents, etc.) to a user who submitted the search query.

CONCLUSION

Systems and methods consistent with the principles of the invention may use history data to score documents and form high quality search results.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 4, the order of the acts may be modified in other implementations consistent with the principles of the invention. Also, non-dependent acts may be performed in parallel.

Further, it has generally been described that server 120 performs most, if not all, of the acts described with regard to the processing of FIG. 4. In another implementation consistent with the principles of the invention, one or more, or all, of the acts may be performed by another entity, such as another server 130 and/or 140 or client 110.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

What is claimed is:

1. A method, comprising:
   identifying a document;
   obtaining a plurality of types of history data associated with the document, the plurality of types of history data including at least two of: data relating to a document inception date, data relating to document changes, query analysis data, data relating to link-based criteria, data relating to anchor text, data relating to document traffic, data relating to user behavior, domain-related data, data relating to ranking history, user maintained or generated data, data relating to unique words, bigrams, or phrases in anchor text, data relating to linkage of independent peers, or data relating to document topics; and
   generating a score for the document based on the plurality of types of history data associated with the document.

2. The method of claim 1, wherein the plurality of types of history data includes the data relating to the document inception date; and
   wherein the generating a score includes:
   determining an inception date corresponding to the document, and
   scoring the document based, at least in part, on the inception date corresponding to the document.

3. The method of claim 2, wherein the document includes a plurality of documents; and
   wherein the scoring the document includes:
   determining an age of each of the documents based on the inception dates corresponding to the documents,
   determining an average age of the documents based on the ages of the documents, and
   scoring the documents based, at least in part, on a difference between the ages of the documents and the average age.

4. The method of claim 2, wherein the generating a score for the document includes scoring the document based, at least in part, on an elapsed time measured from the inception date corresponding to the document.

5. The method of claim 2, wherein the inception date corresponding to the document is based on at least one of a date when a search engine first discovers the document, a date when a search engine first discovers a link to the document, or a date when the document includes at least a predetermined number of pages.

6. The method of claim 1, wherein the plurality of types of history data includes the data relating to document changes; and
   wherein the generating a score includes:
   determining a frequency at which a content of the document changes over time, and
   scoring the document based, at least in part, on the frequency at which the content of the document changes over time.

7. The method of claim 6, wherein the frequency at which the content of the document changes is based on at least one of an average time between the changes, a number of changes in a time period, or a comparison of a rate of change in a current time period with a rate of change in a previous time period.

8. The method of claim 6, wherein the generating a score further includes:
   determining an amount by which the content of the document changes over time, and
   scoring the document based, at least in part, on the frequency at which and the amount by which the content of the document changes over time.

9. The method of claim 8, wherein the amount by which the content of the document changes is based on at least one of a number of new pages associated with the document within a time period, a ratio of a number of new pages associated with the document versus a total number of pages associated with the document, or a percentage of the content of the document that has changed during a time period.

10. The method of claim 8, wherein the determining an amount by which the content of the document changes includes:
    weighting different portions of the content of the document differently based on a measure of importance of the portions, and
    determining the amount by which the content of the document changes as a function of the differently weighted portions of the content.

11. The method of claim 6, wherein the document includes a plurality of documents; and
    wherein the scoring the document includes:
    determining a date on which the content of each of the documents last changed,
    determining an average date of change based on the determined dates on which the contents of the documents last changed, and scoring the documents based, at least in part, on a difference between the dates on which the contents of the documents last changed and the average date of change.

12. The method of claim 1, wherein the plurality of types of history data includes the data relating to document changes; and
    wherein the generating a score includes:
    determining an amount by which a content of the document changes over time, and
    scoring the document based, at least in part, on the amount by which the content of the document changes over time.

13. The method of claim 12, wherein the amount by which the content of the document changes is based on at least one of a number of new pages associated with the document within a time period, a ratio of a number of new pages associated with the document versus a total number of pages associated with the document, or a percentage of the content of the document that has changed during a time period.

14. The method of claim 12, wherein the determining an amount by which the content of the document changes includes:
    weighting different portions of the content of the document differently based on a measure of importance of the portions, and
    determining the amount by which the content of the document changes as a function of the differently weighted portions of the content.

15. The method of claim 1, wherein the plurality of types of history data includes the query analysis data; and wherein the generating a score includes:
  determining an extent to which the document is selected over time when the document is included in a set of search results, and
  scoring the document based, at least in part, on the extent to which the document is selected over time when the document is included in the set of search results.

16. The method of claim 15, wherein the scoring the document includes assigning a higher score to the document when the document is selected more often than other documents in the set of search results over a time period.

17. The method of claim 1, wherein the plurality of types of history data includes the query analysis data; and
  wherein the generating a score includes:
    determining whether the document is associated with search terms that appear in search queries with increasing frequency over time, and
    scoring the document based, at least in part, on whether the document is associated with the search terms.

18. The method of claim 1, wherein the plurality of types of history data includes the query analysis data; and
  wherein the generating a score includes:
    determining whether the document is associated with queries that remain approximately constant over time but lead to results that change over time, and
    scoring the document based, at least in part, on whether the document is associated with queries that lead to results that change over time.

19. The method of claim 1, wherein the plurality of types of history data includes the query analysis data; and
  wherein the generating a score includes:
    determining whether the document is stale, and scoring the document based, at least in part, on whether the document is stale.

20. The method of claim 19, wherein the scoring the document includes:
  determining whether stale documents are considered favorable for a search query when the document is determined to be stale, and
  scoring the document based, at least in part, on whether stale documents are considered favorable for the search query when the document is determined to be stale.

21. The method of claim 20, wherein the determining whether stale documents are considered favorable for the search query is based, at least in part, on how often stale documents were selected over recent documents over time for the search query.

22. The method of claim 1, wherein the plurality of types of history data includes the data relating to link-based criteria; and
  wherein the generating a score includes:
    determining behavior of links associated with the document, and
    scoring the document based, at least in part, on the behavior of links associated with the document.

23. The method of claim 22, wherein the behavior of links relate to at least one of appearance or disappearance of one or more links pointing to the document.

24. The method of claim 23, wherein the appearance of one or more links relates to at least one of a date that a new link to the document appears, a rate at which the one or more links appear over time, or a number of the one or more links that appear during a time period, and the disappearance of one or more links relates to at least one of a date that an existing link to the document disappears, a rate at which the one or more links disappear over time, or a number of the one or more links that disappear during a time period.

25. The method of claim 22, wherein the determining behavior of links associated with the document includes monitoring at least one of time-varying behavior of links associated with the document, how many links associated with the document appear or disappear during a time period, or whether there is a trend toward appearance of new links associated with the document versus disappearance of existing links associated with the document.

26. The method of claim 1, wherein the plurality of types of history data includes the data relating to link-based criteria; and
  wherein the generating a score includes:
    determining a measure of freshness of links associated with the document,
    assigning weights to the links based on the determined measure of freshness, and
    scoring the document based, at least in part, on the weights assigned to the links associated with the document.

27. The method of claim 26, wherein the measure of freshness of a link associated with the document is based on at least one of a date of appearance of the link, a date of a change to the link, a date of appearance of anchor text associated with the link, a date of a change to anchor text associated with the link, a date of appearance of a linking document containing the link, or a date of a change to a linking document containing the link.

28. The method of claim 26, wherein the weight assigned to a link is based on at least one of a measure of trust associated with a document containing the link, a measure of authority of a document containing the link, or a measure of freshness of a document containing the link.

29. The method of claim 26, wherein the scoring the document includes:
  determining an age of each link pointing to the document,
  determining an age distribution associated with the links based on the ages of the links, and
  scoring the document based, at least in part, on the age distribution associated with the links.

30. The method of claim 1, wherein the plurality of types of history data includes the data relating to anchor text; and
  wherein the generating a score includes:
    identifying a change over time in anchor text associated with a link to the document, and
    scoring the document based, at least in part, on the change in anchor text associated with a link to the document.

31. The method of claim 1, wherein the plurality of types of history data includes the data relating to anchor text; and
  wherein the generating a score includes:
    determining whether a content of the document changes such that the content differs from anchor text associated with one or more links to the document, and
    scoring the document based, at least in part, on whether the content of the document changes such that the content differs from the anchor text associated with one or more links to the document.

32. The method of claim 1, wherein the plurality of types of history data includes the data relating to anchor text; and
  wherein the generating a score includes:
    determining a measure of freshness of anchor text associated with one or more links to the document, and
    scoring the document based, at least in part, on the measure of freshness of anchor text associated with one or more links to the document.

33. The method of claim 32, wherein the measure of freshness of anchor text associated with a link to the document is based on at least one of a date of appearance of the anchor text, a date of a change to the anchor text, a date of appearance of a link associated with the anchor text, a date of a change to a link associated with the anchor text, a date of appearance of the document, or a date of a change to the document.

34. The method of claim 1, wherein the plurality of types of history data includes the data relating to document traffic; and
wherein the generating a score includes:
determining characteristics of traffic associated with the document, and
scoring the document based, at least in part, on the characteristics of traffic associated with the document.

35. The method of claim 34, wherein the determining characteristics of traffic associated with the document includes analyzing a traffic pattern associated with the document to identify changes in the traffic pattern over time.

36. The method of claim 1, wherein the plurality of types of history data includes the data relating to user behavior; and
wherein the generating a score includes:
determining user behavior associated with the document, and
scoring the document based, at least in part, on the user behavior associated with the document.

37. The method of claim 36, wherein the user behavior relates to at least one of a number of times that the document is selected within a set of search results or an amount of time that one or more users spend accessing the document.

38. The method of claim 1, wherein the plurality of types of history data includes the domain-related data; and
wherein the generating a score includes:
analyzing domain-related information corresponding to a domain associated with the document over time, and
scoring the document based, at least in part, on a result of the analyzing.

39. The method of claim 38, wherein the scoring the document includes:
determining whether the domain associated with the document is legitimate, and
scoring the document based, at least in part, on whether the domain associated with the document is legitimate.

40. The method of claim 38, wherein the domain-related information is related to at least one of an expiration date of the domain, a domain name server record associated with the domain, or a name server associated with the domain.

41. The method of claim 1, wherein the plurality of types of history data includes the data relating to ranking history; and
wherein the generating a score includes:
determining a prior ranking history of the document, and
scoring the document based, at least in part, on the prior ranking history of the document.

42. The method of claim 41, wherein the scoring the document includes: determining a quantity or rate that the document moves in rankings over a time period, and
scoring the document based, at least in part, on the quantity or rate that the document moves in the rankings.

43. The method of claim 41, wherein the prior ranking history is based on at least one of a number of queries for which the document is selected as a search result over time, a rate at which the document is selected as a search result over time, seasonality, burstiness, or changes in scores over time for a URL-query pair.

44. The method of claim 41, wherein the determining a prior ranking history of the document includes monitoring a rank of the document over time for spikes in the rank.

45. The method of claim 1, wherein the plurality of types of history data includes the user maintained or generated data; and
wherein the generating a score includes:
determining whether the user maintained or generated data indicates that the document is of interest to a user, and
scoring the document based, at least in part, on whether the user maintained or generated data indicates that the document is of interest to a user.

46. The method of claim 45, wherein the user maintained or generated data relates to at least one of favorites lists, bookmarks, temp files, or cache files associated with one or a plurality of users.

47. The method of claim 45, wherein the scoring the document includes:
analyzing the user maintained or generated data over time to identify at least one of trends to add or remove the document, a rate at which the document is added to or removed from the user maintained or generated data, or whether the document is added to, deleted from, or accessed through the user maintained or generated data, and
scoring the document based, at least in part, on a result of the analyzing.

48. The method of claim 1, wherein the plurality of types of history data includes the data relating to anchor text; and
wherein the generating a score includes:
determining a growth profile of anchor text associated with one or more links to the document, and
scoring the document based, at least in part, on the growth profile of anchor text associated with one or more links to the document.

49. The method of claim 1, wherein the plurality of types of history data includes the data relating to linkage of independent peers; and
wherein the generating a score includes:
determining a growth in a number of independent peers that include links to the document, and
scoring the document based, at least in part; on the number of independent peers.

50. The method of claim 1, wherein the plurality of types of history data includes the data relating to document topics; and
wherein the generating a score includes:
performing topic extraction relating to the document,
monitoring a topic of the document for changes over time, and
scoring the document based, at least in part; on changes to the topic of the document.

51. The method of claim 1, further comprising:
obtaining a search query, where the identified document is identified as relevant to the search query; and
generating a relevancy score for the document based on how relevant the document is to the search query; and
wherein the generating a score for the document is based, at least in part, on the plurality of types of history data and the relevancy score.

52. A system, comprising:
means for identifying a document;
means for obtaining a plurality of types of history data associated with the document, the plurality of types of history data including at least two from a group comprising: data relating to an inception date associated with the document, data relating to changes to the document, query analysis data relating to the document, data relating to link-based criteria associated with the document, data relating to anchor text associated with links to the document, data relating to traffic associated with the document, data relating to user behavior associated with the document, domain-related data associated with the document, data relating to ranking history associated with the document, user maintained or generated data relating to the document, data relating to unique words, bigrams, or phrases in anchor text associated with links to the document, data relating to linkage of independent peers, or data relating to a topic associated with the document; and means for generating a score for the document based, at least in part, on the plurality of types of history data.

53. A system, comprising:

a history component configured to obtain a plurality of types of history data associated with a document, the plurality of types of history data including at least two of: data relating to an inception date associated with the document, data relating to changes to the document, query analysis data relating to the document, data relating to link-based criteria associated with the document, data relating to anchor text associated with links to the document, data relating to traffic associated with the document, data relating to user behavior associated with the document, domain-related data associated with the document, data relating to ranking history associated with the document, user maintained or generated data relating to the document, data relating to unique words, bigrams, or phrases in anchor text associated with links to the document, data relating to linkage of independent peers, or data relating to a topic associated with the document; and a ranking component configured to:

generate a score for the document based, at least in part, on the plurality of types of history data associated with the document.

54. A method comprising:

determining an age of linkage data associated with a linked document, the linkage data including a rank based, at least in part, on links and anchor text provided by one or more linking documents and related to the linked document;

ranking the linked document based on a decaying function of the age of the linkage data;

determining longevity of the linkage data;

deriving an indication of content update for at least one of the one or more linking documents providing the linkage data; and adjusting the ranking of the linked document based on the longevity of the linkage data and the indication of content update for the linking document.

55. The method of claim 54, wherein the adjusting the ranking includes penalizing the ranking if the longevity indicates a short life for the linkage data and boosting the ranking if the longevity indicates a long life for the linkage data.

56. The method of claim 55, wherein the adjusting the ranking further includes penalizing the ranking if at least a portion of content from the linking document is considered stale over a period of time and boosting the ranking if the portion of content from the linking document is considered updated over the period of time.

* * * * *